USO05208832A

United States Patent [19]
Greiss

[11] Patent Number: 5,208,832
[45] Date of Patent: May 4, 1993

[54] METHODS AND APPARATUS FOR DETECTING REPETITIVE SEQUENCES

[75] Inventor: Israel Greiss, Raanana, Israel

[73] Assignee: National Semiconductor Corporation, Santa Clara, Calif.

[21] Appl. No.: 887,105

[22] Filed: May 19, 1992

Related U.S. Application Data

[63] Continuation of Ser. No. 564,791, Aug. 8, 1990, abandoned.

[51] Int. Cl.[5] .............................................. H04B 3/10
[52] U.S. Cl. .................................. 375/13; 364/715.11; 375/96
[58] Field of Search ...................... 375/13, 94, 96, 116; 364/715.11, 724.11, 728.03; 371/5.1, 5.5, 6

[56] References Cited

U.S. PATENT DOCUMENTS 4,516,220  5/1985  Baumann ....................... 364/715.11
4,575,864  3/1986  Rice, Jr. et al. ................ 364/715.11

Primary Examiner—Benedict V. Safourek
Attorney, Agent, or Firm—Limbach & Limbach

[57] ABSTRACT

The existence of a training sequence in a demodulated signal is detected by first estimating the signal level of the demodulated signal. Next, the error level of the demodulated signal is estimated. The estimated signal level and the estimated error level are then compared against a decision criteria to determine whether a training sequence has been detected.

7 Claims, 8 Drawing Sheets

| INSTRUCTION | OPC1 | OPC0 | CLR | COJ | OPERATION | CYCLES |
|---|---|---|---|---|---|---|
| VCMAD | 0 0 0 0 | 0 0 0 0 | 0 0 1 1 | 0 1 0 1 | $C[i] \Leftarrow C[i] + Y \times D[i]$<br>$C[i] \Leftarrow C[i] + Y \times D[i]*$<br>$C[i] \Leftarrow Y \times D[i]$<br>$C[i] \Leftarrow Y \times D[i]*$ | $9 + (N \times 8)$ |
| VCMUL | 0 0 0 0 | 1 1 1 1 | 0 0 1 1 | 0 1 0 1 | $C[i] \Leftarrow C[i] \times (1+D[i])$<br>$C[i] \Leftarrow C[i] \times (1+D[i]*)$<br>$C[i] \Leftarrow C[i] \times D[i]$<br>$C[i] \Leftarrow C[i] \times D[i]*$ | $9 + (N \times 8)$ |
| VCMAC | 1 1 1 1 | 0 0 0 0 | 0 0 1 1 | 0 1 0 1 | $A \Leftarrow A + \text{SIGMA}(C[i] \times D[i])$<br>$A \Leftarrow A + \text{SIGMA}(C[i] \times D[i]*)$<br>$A \Leftarrow \text{SIGMA}(C[i] \times D[i])$<br>$A \Leftarrow \text{SIGMA}(C[i] \times D[i]*)$ | $6 + (N \times 8)$ |
| VCMAG | 1 1 1 1 | 1 1 1 1 | 0 0 1 1 | 0 1 0 1 | $A \Leftarrow A + \text{SIGMA}(C[i] \times C[i])$<br>$A \Leftarrow A + \text{SIGMA}(C[i] \times C[i]*)$<br>$A \Leftarrow \text{SIGMA}(C[i] \times C[i])$<br>$A \Leftarrow \text{SIGMA}(C[i] \times C[i]*)$ | $5 + (N \times 8)$ |

FIG. 5

| DS1 | DS0 | EXTERNAL BUFFER SIZE (DM) | CONSTANT ADDRESS BITS | INCREMENTED ADDRESS BITS |
|---|---|---|---|---|
| 0 | 0 | 8 | A0, A5 – A23 | A1 – A4 |
| 0 | 1 | 16 | A0, A6 – A23 | A1 – A5 |
| 1 | 0 | 32 | A0, A7 – A23 | A1 – A6 |
| 1 | 1 | 64 | A0, A8 – A23 | A1 – A7 |

FIG. 6

METHODS AND APPARATUS FOR DETECTING REPETITIVE SEQUENCES

This is a continuation of co-pending application Ser. No. 07/564,791 filed on Aug. 8, 1990, now abandoned.

BACKGROUND OF THE INVENTION

1. Field of the Invention

The present invention relates to data processing systems and, in particular, to for detecting the existence of repetitive data sequences in a received signal using pattern recognition. The invention has particular application for detecting training sequences for Quadrature Amplitude Modulation (QAM) modem receivers.

2. Discussion of the Prior Art

The basic function of any communications system is to transmit information over a communication channel from an information source to a destination as fast and as accurately as possible.

There are two general types of information sources. Analog sources, such as a telephone microphone, generate a continuous signal. Digital sources, such as a digital data processing system, generate a signal that consists of a sequence of pulses.

Communications channels that are designed to transmit analog signals (e.g., the telephone network) have characteristics which make it difficult for them to transmit digital signals. To permit the transmission of digital pulse streams over an analog channel, it is necessary to utilize the digital data pulses to modulate a carrier waveform that is compatible with the analog transmission channel.

The equipment that performs the required modulation is generally referred to as a "MODEM". The term "MODEM" is an acronym for MOdulator-DEModulator, since one piece of equipment typically includes the capability not only to modulate transmitted signals, but also to demodulate received signals to recover the digital data from the modulated analog carrier waveform.

While passing through the transmission channel, the modulated carrier waveform suffers from distortion introduced both by the system itself and by noise contamination. Thus, one of the tasks of the modem's demodulating receiver function is to filter the signal received from the transmission channel to improve the signal-to-noise (S/N) ratio. The modem receiver also recovers timing information from the received signal to provide sampling points for recovering the digital data. The modem receiver may also condition the data in other ways to make it suitable for additional processing.

In a conventional modem, the signal filtering, timing recovery and conditioning tasks are performed by three functional units: analog-to-digital conversion circuitry ("analog front end") that converts the received modulated carrier waveform to a digitized replica, a digital signal processor (DSP) that retrieves the digital data from the digitized replica using a recovered timing signal, and a control function for controlling both the analog front end and the DSP. The DSP recovers the data by implementing a signal conditioning and data recovery algorithm that is specific to the type of data being received.

Typically, the modem's filtering function is "adaptive". That is, the data symbols of the received signal are used to continuously update the coefficients of the filter's transform function to improve its performance. The initial setting of these coefficients, for example, at system power-up, is usually accomplished in an iterative "training" procedure. This procedure involves transmitting a training sequence to the modem to allow the modem receiver to adjust its filter coefficients to the desired values. The training sequence is preceded by a repetitive signal that alternates between two levels to indicate the existence of the training sequence.

A major problem in "training" a modem receiver's adaptive filter is the presence of noise in the observed output values. Thus, the early detection of the existence of a training sequence in a noisy received signal with a specified Signal to Noise threshold (S/N) is very important for modem implementation.

As stated above, a conventional modem receiver uses DSP or an analog implementation of band pass filters and adaptive detection to detect energy above the specified S/N threshold.

The DSP implementations require many time-consuming multiplication operations.

Analog implementations are difficult to implement in today's high density integrated circuits.

SUMMARY OF THE INVENTION

The present invention provides a mechanism for detecting the existence of repetitive sequences, such as the beginning of training sequences for a QAM modem receiver, using pattern recognition.

In accordance with the present invention, the existence of a training sequence in a demodulated signal is detected by first estimating the signal level of the demodulated signal. Next, the error level is estimated. Finally, the estimated signal level and the estimated error level are compared against a decision criterion to determine whether a training sequence has been detected.

Thus, the present invention provides a reliable technique for detecting the start of a training sequence in a modem receiver with a very low false alarm rate and a high detection probability. The technique is not influenced by line impairments such as frequency response, group delay and absolute signal level. Moreover, the technique does not require a multiplier. Therefore, a software implementation can be performed efficiently using less processing power and a hardware implementation will be less expensive. The technique provides an efficient implementation for a complex signal and a programmable relative S/N threshold using a shift operation rather than a conventional multiply operation.

A better understanding of the features and advantages of the present invention will be obtained by reference to the following detailed description and accompanying drawings which set forth an illustrative embodiment in which the principles of the invention are utilized.

DESCRIPTION OF THE DRAWINGS

FIG. 5 provides an instruction set summary for the DSP module shown in FIG. 3.

FIG. 6 is a table illustrating the handling of cyclic buffers in the DSP module shown in FIG. 3.

DETAILED DESCRIPTION OF THE INVENTION

Figure 1:
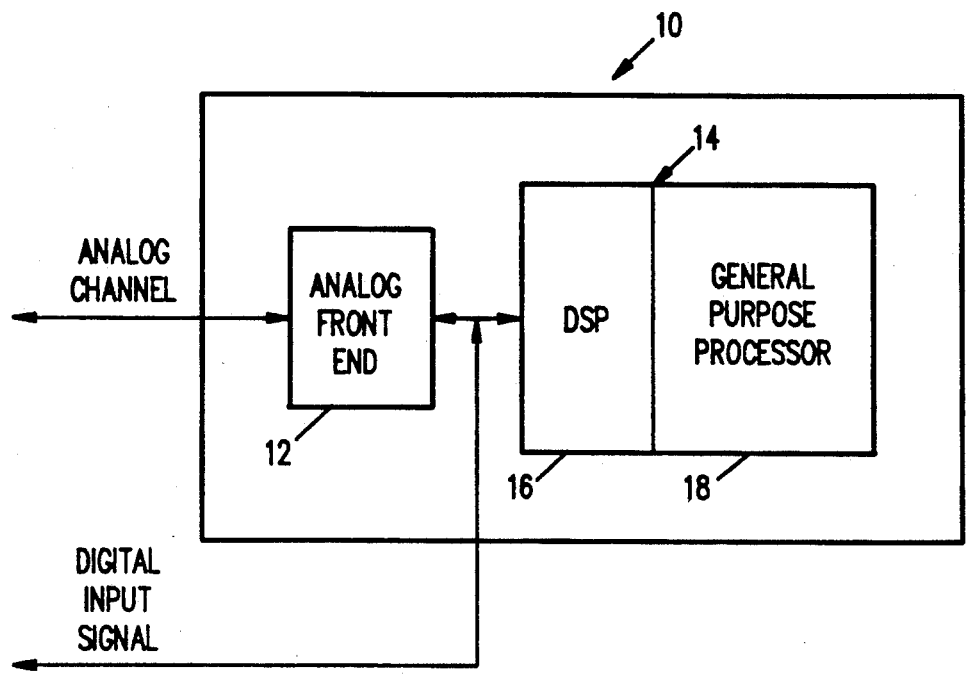
FIG. 1 is a block diagram illustrating the basic functional partitioning of a data processing system in accordance with the present invention.

FIG. 1 shows a data processing system 10 that includes two primary functional elements: an analog front end 12 and an integrated processing platform 14. The integrated processing platform 14 includes both a digital signal processor (DSP) module 16 and a general purpose processor (GPP) 18.

The analog front end 12 converts a modulated input signal received from an analog transmission channel, e.g. a telephone line, to a digitized replica of the modulated input signal. The analog front end 12 can be implemented utilizing conventional, off-the-shelf integrated circuit products available for this purpose.

As stated above, the integrated processor platform 14 includes a DSP module 16 that recovers digital data from the digital signal generated by the analog front end 12. The DSP module 16 includes a processing mechanism, described in greater detail below, that conditions the digital signal utilizing an algorithm comprising a selected sequence of DSP operations.

The general purpose processor 18 controls the DSP module 16 and processes the digital data generated by the DSP module 16 to a desired end result. The general purpose processor 18 may be any conventional state-of-the-art microprocessor.

As further shown in FIG. 1, while in many applications, the analog front end 12 will be utilized to convert a modulated input signal received on an analog channel to a corresponding digital signal, there are a growing number of applications (e.g., ISDN and T1) in which a digital input signal will be received by the integrated processor platform 14 directly from a digital source.

Figure 2:
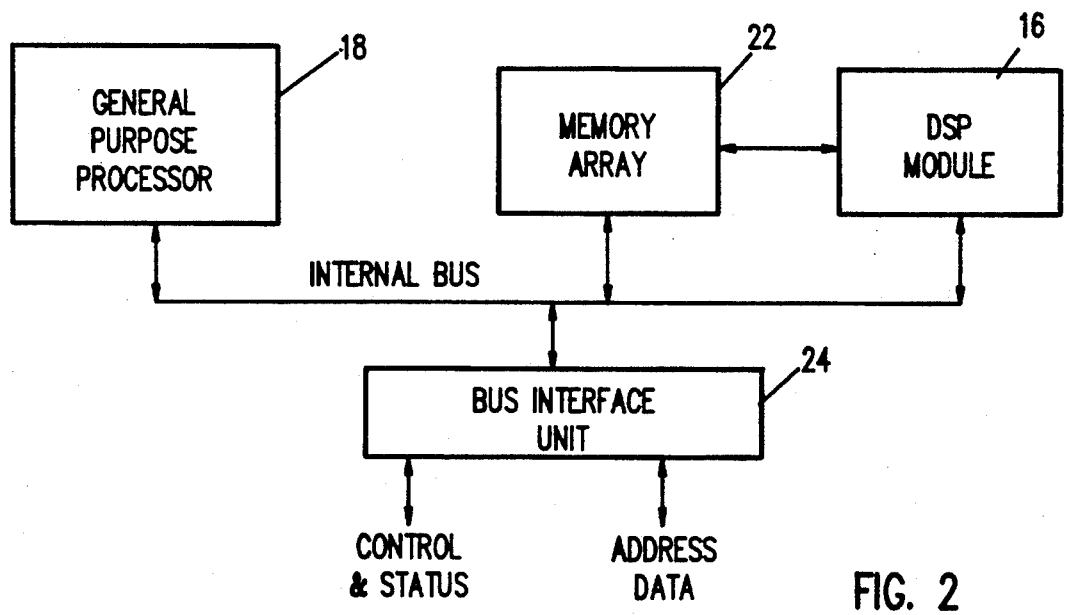
FIG. 2 is a block diagram illustrating the primary functional units of a data processing system in accordance with the present invention.

Referring to FIG. 2, both the DSP module 16 and the general purpose processor 18 are connected to an internal bus 20, allowing both the DSP module 16 and the general purpose processor 18 to communicate with a system memory (not shown) via a conventional bus interface unit 24 for transfer of control/status information and addresses/data therebetween. It will be understood by those skilled in the art that the internal bus 20 comprises both an internal address bus for handling address references by both the DSP module 16 and the general purpose processor 18 and an internal data bus for handling instruction and data transfers.

To save bus bandwidth, the DSP module 16 stores operands used in executing DSP algorithms in an internal RAM memory array 22 which, as will be described in greater detail below, is also accessible to the general purpose processor 18. That is, the internal memory array 22 serves as a shared resource for both the DSP module 16 and the general purpose processor 18. In the illustrated embodiment, the internal memory is shown as accessible by the DSP module 16 and the general purpose processor 18 via the internal bus 20. It will be understood by those skilled in the art that other bus structures would also provide the desired shared accessibility to the internal memory array 22; for example, the internal memory array 22 could be implemented as a dual port memory.

As described in greater detail below, the DSP module 16 may fetch operands in parallel from the internal memory array 22 and system memory.

The DSP module 16 executes vector operations on complex variables that are optimized for DSP applications. The general purpose processor 18 treats the DSP module 16 as a memory mapped I/O device that occupies a reserved memory space, interfacing with the DSP module 16 via a set of memory mapped registers.

Figures 3, 4:
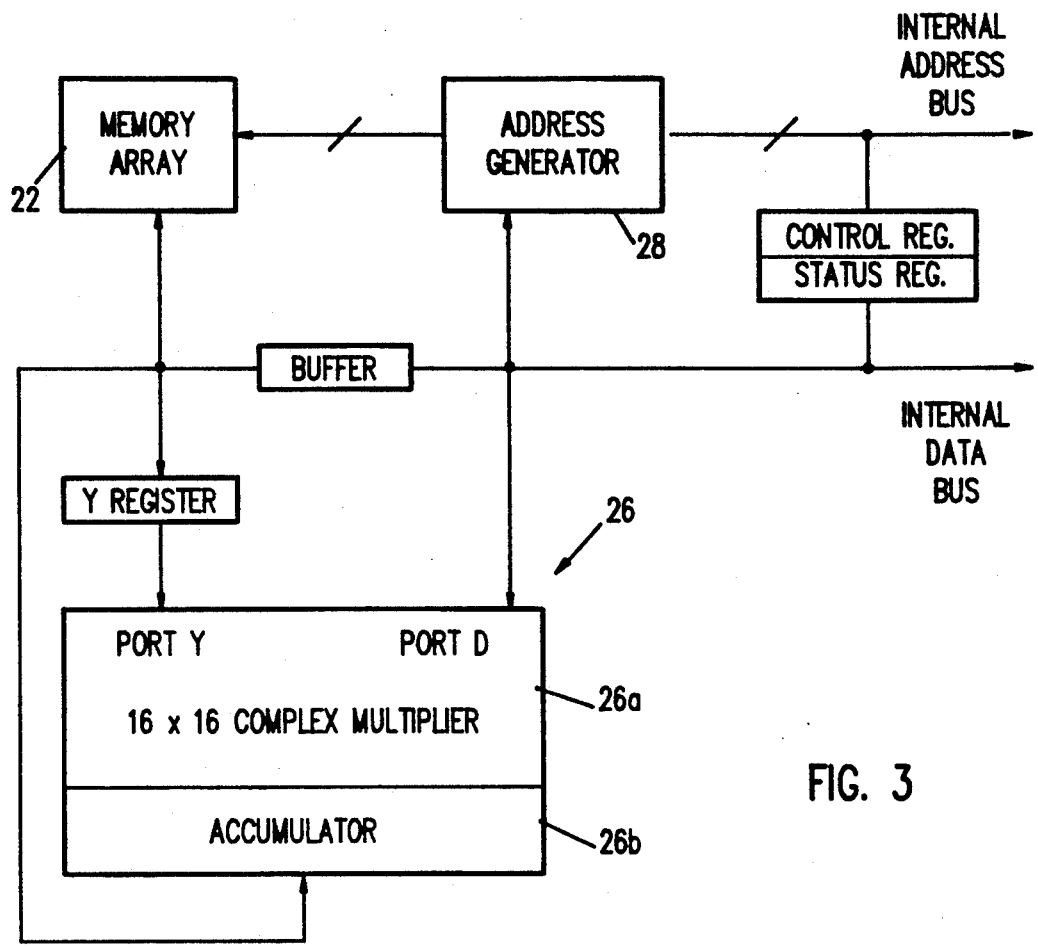
FIG. 3 is a block diagram illustrating a DSP module utilizable for detecting repetitive sequences in accordance with the present invention.
FIG. 4 is a table illustrating the memory organization of a complex vector for use in the DSP module shown in FIG. 3.

As shown in FIG. 3, the DSP module 16 use the internal shared memory array 22 as well as a multiplier-/accumulator 26. The DSP module 16 also includes its own internal address generator 28 for system memory and internal operand accesses, thus reducing the load on the general purpose processor 18. Both the multiplier-/accumulator 26 and the address generator 28 are conventional implementations.

In the operation of the data processing system 10, the general purpose processor 18 selects from a basic set of DSP operations to define a specific sequence of operations as the DSP algorithm to be executed by the DSP module 16 for recovering data from the incoming digital signal. The general purpose processor then retrieves operands required for execution of the selected DSP algorithm, and/or instructions and data critical to the general purpose processor for controlling the DSP module 16 or for performing general purpose tasks, and loads them into the internal RAM array 22. The general purpose processor then invokes the first DSP operation in the selected sequence by issuing the corresponding command to the control register of the DSP module 16. The DSP module then places the general purpose processor 18 in a continuous wait state while it performs the first DSP operation utilizing operands retrieved by the address generator 28 from the RAM array 22 and system memory. Upon completion of the DSP operation, the DSP module cancels the continuous wait state and the general purpose processor 18 then either reads the status of the DSP module 16 or the result of the DSP operation or carries on with the execution of its normal program flow, which may be either invoking the next DSP operation in the selected sequence by issuing the appropriate command to the DSP module control register or performance of a general purpose task. This process continues until the selected sequence of DSP operations has been completed. The general purpose processor may then download the contents of the shared internal RAM array 22 and retrieve a new set of operands, instructions and data for further DSP operations or general purpose processing tasks.

As further shown in FIG. 3, the DSP module 16 performs complex arithmetic calculations on two vector operands provided to the multiplier/accumulator 26 at Port Y and Port D. One vector is retrieved from the internal memory array 22. The other vector is either organized as a circular buffer in the system memory (described in greater detail below) or retrieved from the internal memory array 22.

The DSP module 16 executes vector operations in a two stage pipeline. This allows for a significant performance enhancement as the fetch and execution of operands for consecutive vector elements are performed simultaneously rather than in a strictly sequential manner. The DSP module 16 can fetch up to two data elements at a time, using its address generator 28 for system memory access and the internal array 22 for the second operand. While fetching operands for one vector element, the DSP module 16 performs the multiply and add operations on the previous vector element.

The DSP module 16 contains seven registers in addition to the RAM array 22. These registers, as well as the internal memory array 22, are accessed by the general purpose processor 18 as memory-mapped I/O devices. Each storage location in the internal memory array 22 is 32 bits wide and holds one complex number.

As stated above, the internal memory array 22 is not limited to storage of filtering coefficients for a specific DSP algorithm. It can also be used as a fast, zero-wait state, integrated memory for storing instructions and data utilized by the general purpose processor 18 as well as for storing selected operands for use by the DSP module 16 for processing a variety of data signal formats.

The memory array 22 can be used for instruction fetches with only one restriction: instructions must be loaded into the array 22 using word aligned accesses. This can be achieved by moving the aligned double-word from system memory to memory array 22. Data can also be stored in the memory array 22 with one restriction: storing data in the array 22 can be done only if all the data is written using aligned word or double-word accesses.

The multiplier input register Y is a 32-bit register that holds one complex operand. The multiplier input register Y is mapped into two consecutive words called Y0 and Y1.

The accumulator register A is a 32-bit register that holds one complex result. The A register is mapped into consecutive words, also called A0 and A1. Internally, A0 and A1 are 32-bit registers. However, only bits 15-30 (i.e., 16 bits) are visible. The rest of the bits are used for a higher dynamic range and intermediate calculations.

The operation of the DSP module 16 will now be described in greater detail; the following terms will be used in the operational description:

C[i]—A complex entry in internal memory array 22, entry [i] can be selected by address generator 28 or directly accessed by CPU 18;
D[i]—Complex data from system memory fetched using address generator 28;
Y—Complex Multiplier input register 30 in FIG. 4;
D[i]—The complex conjugate of D[i];
A—Complex Accumulator register.

The DSP module 16 executes the following six basic commands:
VCMAC—Vector Complex Multiply Accumulate
VCMAG—Vector Complex Magnitude
VCMAD—Vector Complex Multiply Add
VCMUL—Vector Complex Multiply
LOAD—Write into C, Y, A or CTL
STORE—Read from C, Y, A, ST or CTL The VCMAC, VCMAD and VCMUL commands use the following parameters:
D—Vector Start Address in system memory
C—Vector Start Address in internal RAM Vector Length Control bits The VCMAG command uses only the last three operands.

Complex numbers are organized in the internal memory array 22 as double words. Each double word contains two 16-bit 2's complement fixed-point fractional integers. The less significant word contains the Real part of the number. The most significant word contains the Imaginary part of the number.

The complex vectors utilized by the DSP module 16 consist of arrays of complex numbers stored in consecutive addresses. Complex vectors must be aligned to double word boundary. FIG. 4 illustrates the memory organization of a vector D.

Referring back to FIG. 3, the arithmetic logic unit 26 of the DSP module 16 contains a 16×16 multiplier 26a and a 32-bit adder/accumulator 26b. Bits 15–30 (16 bits) of the result are rounded and can be read by accessing the A register. If an overflow is detected during an operation, the Status Register (ST) overflow bit and either the OP0 bit or the OP1 bit is set to "1".

When data is loaded into the adder/accumulator 26a, the 16 bits of data loaded into bits 15–30, the lower bits are set to "0", while bit 31 gets the same value as bit 30 (sign extended). An overflow is detected whenever the value of bit 30 is different from the value of bit 31.

Each basic DSP operation or instruction to be performed by the DSP module 16 is controlled by two OP-code bits (OPC0 and OPC1) and two specifiers (COJ and CLR). COJ specifies whether the operand on port D of the multiplier 26a must be conjugated prior to multiplication. The CLR bit is used to extend the instruction set. On VCMAC and VCMAG, CLR specifies whether the accumulator 26b must be cleared at the beginning of the vector operation. On VCMAD, CLR specifies that the operation will ignore the value of C[i]. In VCMUL, CLR indicates that the value of D[i] is to be taken instead of 1+D[i].

FIG. 5 provides a summary of the set of basic DSP operations executed by the DSP module 16 as a function of the OPC1, OPC0, COJ, and CLR bits in the CTL register. In FIG. 5, "SIGMA" represents the summation sign $$\sum_{i=1}^{N}$$

All the operands are complex numbers. Thus, A=-SIGMA C[i]×D[i] breaks down to:

$$Re(A) = \text{Sigma}\{Re(C[i]) \times Re(D[i]) - Im(C[i]) \times Im(D[i])\}$$

$$Im(A) = \text{Sigma}\{Re(C[i]) \times Im(D[i]) + Im(C[i]) \times Re(D[i])\}$$

The accumulator 26b, the multiplier input register Y, the external data pointer DPTR and the coefficient pointer CPTR registers are used as temporary registers during vector operations. Values stored in these register prior to activation of the DSP module 16 are destroyed. If the content of the accumulator register A after an operation of the DSP module 16 is used as an initial value for the next operation, it then must be remembered that the least significant bits may contain a value of other than zero.

As stated above, the DSP module 16 accesses arrays of data in external memory using the DPTR pointer as an address. The DS0 and DS1 bits of the CTL register control the size of the array. The DSP module 16 allows a convenient way of handling data arrays as a FIFO. Only the appropriate number of the least significant bits of the DPTR are incremented on each access. The upper bits remain constant. FIG. 6 shows which bits are incremented. The rest remain constant.

Additional information regarding the data processing system 10 may be obtained by reference to co-pending and commonly-assigned U.S. patent application Ser. No. 467,148, INTEGRATED DIGITAL SIGNAL PROCESSOR/GENERAL PURPOSE CPU WITH SHARED INTERNAL MEMORY, filed Jan. 18, 1990 by Amos Intrater et al, which application is hereby incorporated by reference to provide background for the present invention.

Figure 7:
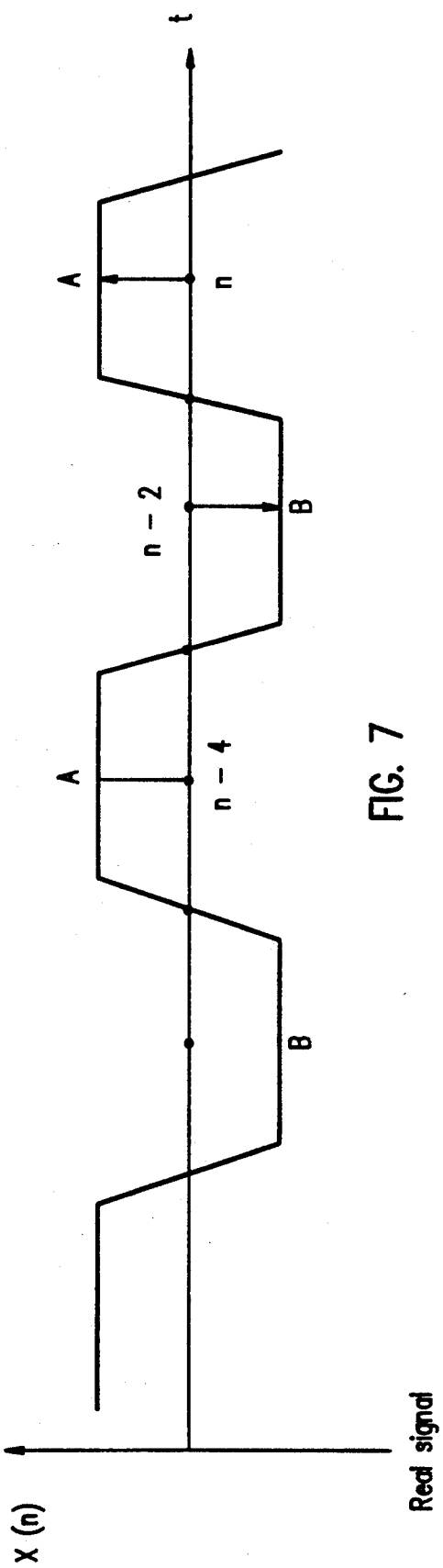
FIG. 7 is a timing diagram illustrating the waveform of a demodulated repetitive real signal that consists of two levels.

FIG. 7 shows a demodulated repetitive real baseband signal that consists of two levels, level A and level B, as a function of time. This is a typical waveform of the real and imaginary outputs of a demodulated P_2 sequence after a low pass filter. As shown in FIG. 7, the sampling points at $n-4$, $n-3$, $n-2$, $n-1$ and $n$ are spaced apart by T/2 sec, i.e. two samples per Baud.

Figure 8:
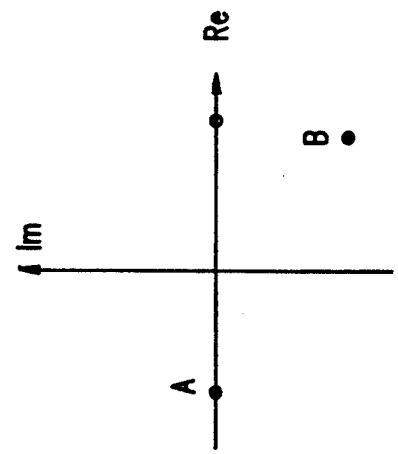
FIG. 8 illustrates a complex plan of the demodulated signal shown in FIG. 7.

FIG. 8 shows the same demodulated signal as shown in FIG. 7, but in a complex plan.

This repetitive sequence is caused by the V.29 P_2 sequence, which is constructed from repetitions of A,B-,A,B . . . points.

Figure 9:
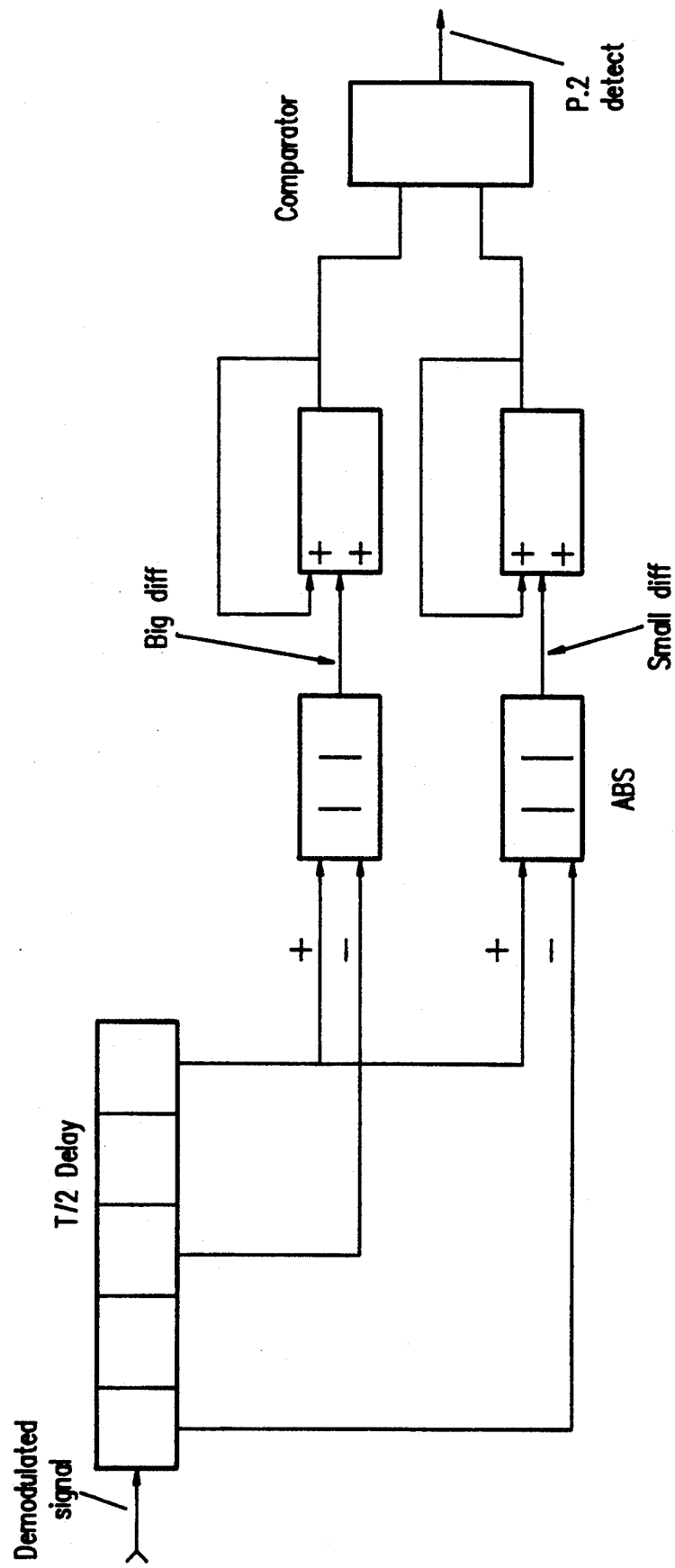
FIG. 9 is a block diagram illustrating a module for detecting repetitive sequences in accordance with the present invention.

Referring to FIG. 9, which shows a hardware block diagram illustrating the logic of a repetitive sequence detection module in accordance with the present invention, the decision on the existence of a P_2 training sequence is based on pattern recognition of the demodulated baseband signal (after the low pass filter).

The demodulated signal inputs to the module are the sampled outputs from the demodulator of a QAM receiver after a low pass filter. An example of a QAM modem receiver utilizable for generating the sampling points is described in co-pending and commonly-assigned U.S. patent application Ser. No. 563,434, , FINE TIMING RECOVERY FOR QAM MODEM RECEIVER, filed Aug. 7, 1990 by Iddo Carmen, which application is hereby incorporated by reference to provide background for the present invention.

Figure 10:
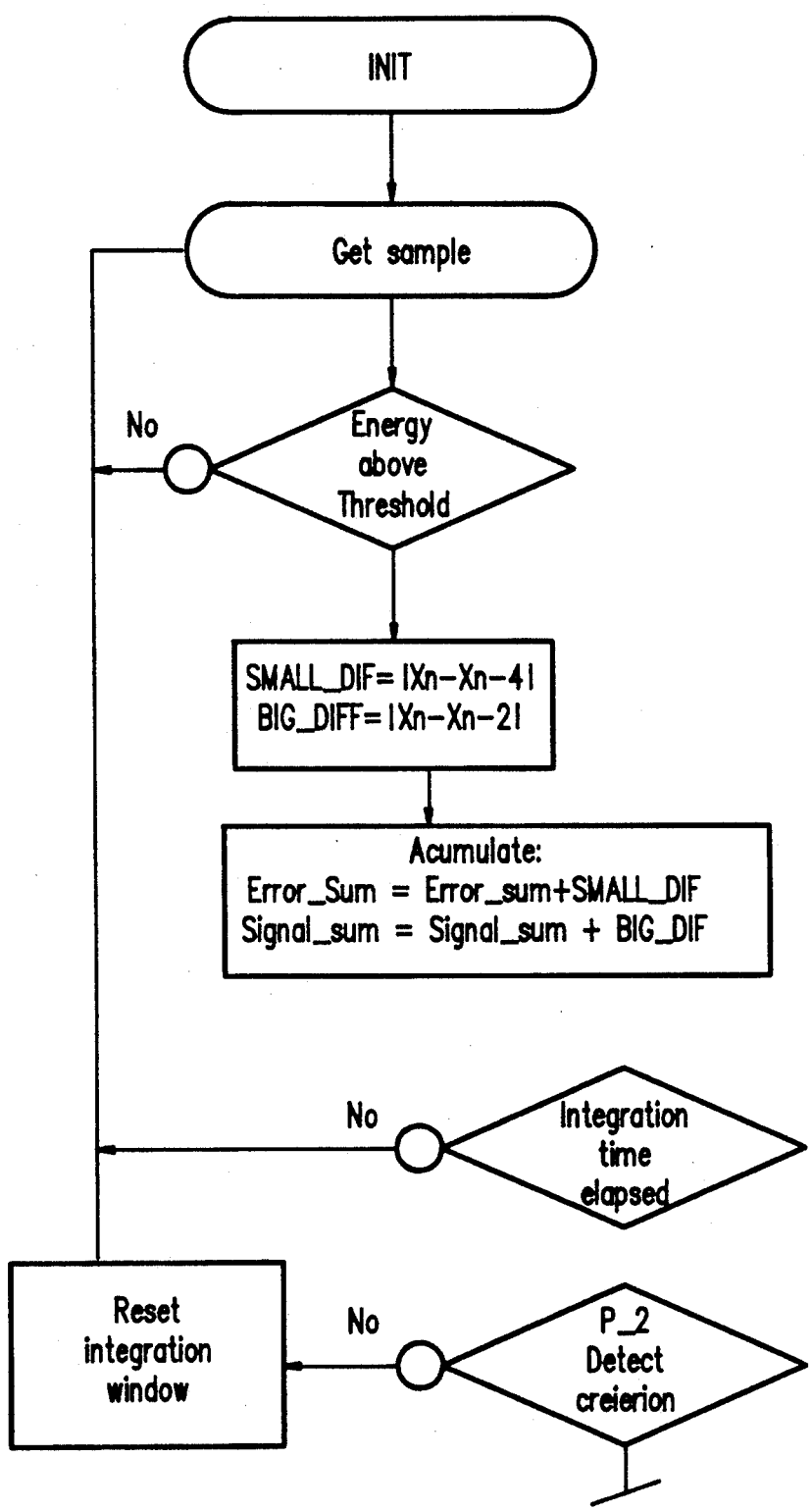
FIG. 10 is a flow chart illustrating detection of repetitive sequences in accordance with the present invention.

As further shown in FIG. 9, and in the corresponding FIG. 10 flow chart, the absolute distance between two samples is calculated:

SMALL_DIF = $|X_n - X_{n-4}|$; spaced 2T between points

BIG_DIF = $|X_n - X_{n-2}|$; spaced T between points

These absolute distances must satisfy the following two criteria:

SMALL_DIF < 2N (1)

BIG_DIF > 2(S−N) = 2[(S/N)−1]N (2)

where
N = Noise level
S = Signal level
From criterion (2), we obtain

BIG_DIF/[(S/N)−1] > 2N (3)

(1) and (3) combined to provide the following single criterion:

[BIG_DIF/[(S/N)−1]] − SMALL_DIF > 0 (4)

In reality, instead of 0, criterion (4) is required to use a small number in order to prevent possible detection of an unmodulated carrier with a very small BIG_DIF.

In accordance with the present invention, the conventional multiplication by the threshold TRESH = 1/[(S/N)−1] is replaced by a shift operation. The detection threshold is then [(S/N)−1] = 4, i.e. two shifts left, instead of a divide operation, for criterion of S/N = 14db.

To increase detection reliability, the decision is performed after accumulation of several symbols,, as shown in FIGS. 9 and 10.

Thus, the decision criterion is:

mag (Signal_sum) * TRESH-mag Error_sum) > $\epsilon$

Figure 11:
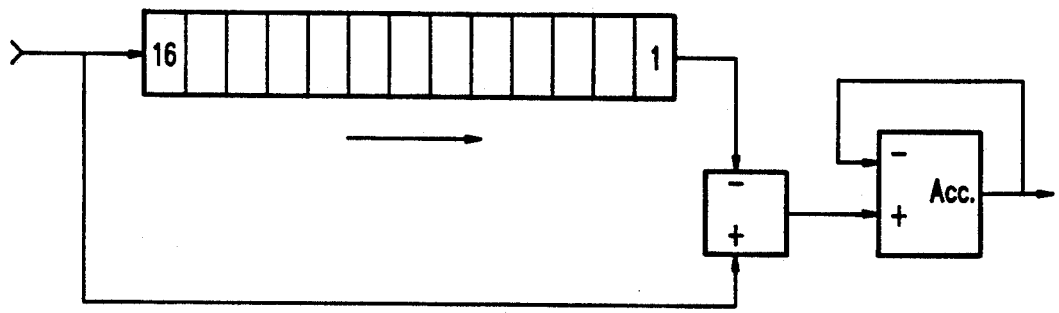
FIG. 11 a block diagram illustrating utilization of a moving window accumulator for detecting repetitive sequences in accordance with the present invention.

Implementation of this criterion with a processor that does not support a multiplication function can be performed on complex numbers by accumulating together the real and imaginary errors, as shown in FIG. 11. In this case, the decision criterion is:

(Signal_sum.re + Signal_sum.im) >> 2-(Error_sum.re + Error_sum.im) > $\epsilon$

Figure 12:
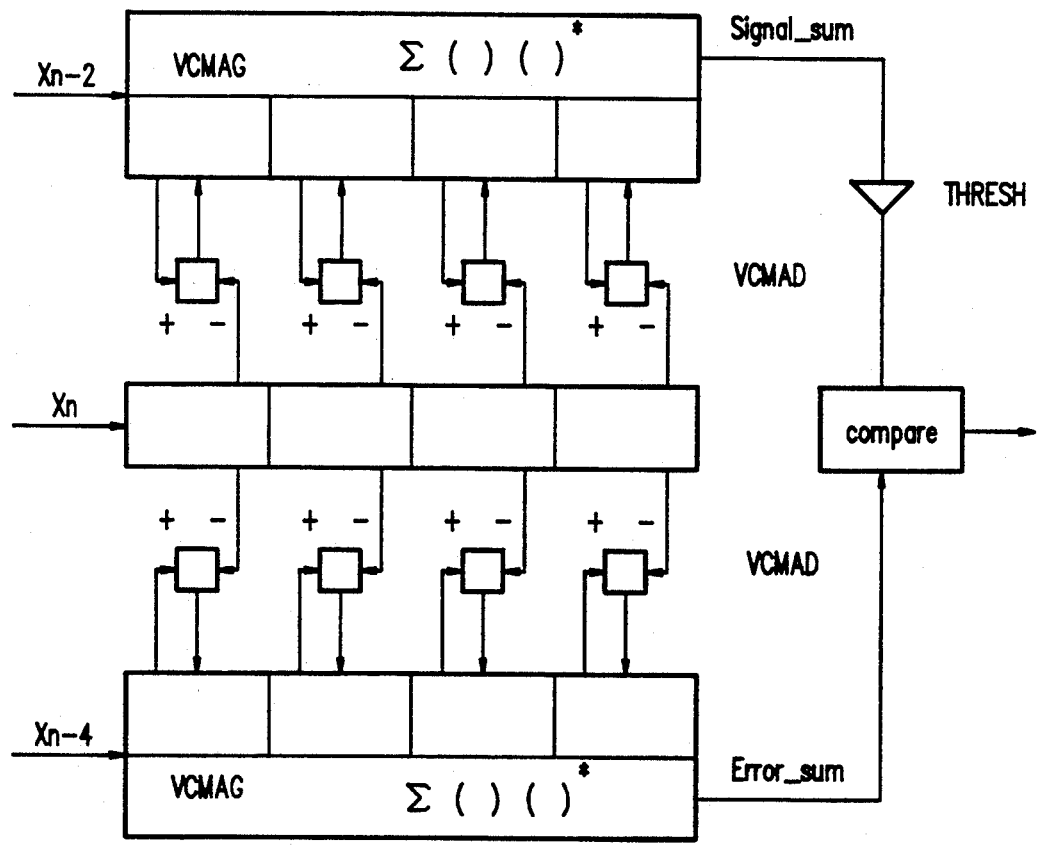
FIG. 12 is a block diagram illustrating an implementation of the invention utilizing a DSP module.

As shown in FIG. 12, implementation of the criterion algorithm on DSP module can be performed by calculating the Euclidian distances between two points by a $\Sigma X_n^2$ instruction utilizing taps T.

With respect to the DSP module 10 described above, the following two instructions are used to calculate the sum of squares of the difference between two vectors, instead of the sum of the absolute value of the differences: the VCMAD instruction is the LMS adapt operation:

C[i] ← C[i] + Y*D[i].

By assigning Y ← −1, this instruction can be used to calculate the difference between the complex vectors C[i] and D[i].

The second instruction that calculates the sum of squares of the result vector is the VCMAG instruction. The VCMAG instruction is the power operation:

C[i] = A + C[i]*C[i]

It should be understood that various alternatives to the embodiments of the invention described herein may be employed in practicing the invention. It is intended that the following claims define the scope of the invention and that methods and apparatus within the scope of these claims and their equivalents be covered thereby.

What is claimed is:

1. A method for detecting a repetitive sequence in a received signal, the method comprising:
   (a) estimating the signal level of the received signal;
   (b) estimating the error level of the received signal; and
   (c) comparing the estimated signal level and the estimated error level against a decision criterion to arrive at a decision regarding the existence of the repetitive sequence.

2. A method as in claim 1 wherein the repetitive sequence is a modem training sequence.

3. A method as in claim 1 wherein the method utilizes a DSP module for detecting the existence of the repetitive sequence.

4. Apparatus for detecting a repetitive sequence in a received signal, the apparatus comprising:

(a) means for estimating the signal level of the received signal;

(b) means for estimating the error level of the received signal; and (c) means for comparing the estimated signal level and the estimated error level against a decision criteria to arrive at a decision regarding the existence of the repetitive sequence.

5. Apparatus as in claim 4 wherein the apparatus includes a DSP module.

6. Apparatus as in claim 4 wherein the repetitive sequence is a modem training sequence.

7. Apparatus as in claim 6 wherein the repetitive sequence is a training sequence for a V.27 or V.29 modem.

* * * * *